(12) United States Patent
Leonardo et al.

(10) Patent No.: US 10,008,819 B2
(45) Date of Patent: Jun. 26, 2018

(54) BROADBAND RED LIGHT GENERATOR FOR RGB DISPLAY

(71) Applicant: IPG PHOTONICS CORPORATION, Oxford, MA (US)

(72) Inventors: Manuel Leonardo, Santa Clara, CA (US); Igor Samartsev, Westborough, MA (US); Alexey Avdokhin, Southborough, MA (US); Gregory Keaton, Oxford, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days. days.

(21) Appl. No.: 15/511,798

(22) PCT Filed: Sep. 16, 2015

(86) PCT No.: PCT/US2015/050381
§ 371 (c)(1),
(2) Date: Mar. 16, 2017

(87) PCT Pub. No.: WO2016/044395
PCT Pub. Date: Mar. 24, 2016

(65) Prior Publication Data
US 2017/0294754 A1 Oct. 12, 2017

Related U.S. Application Data

(60) Provisional application No. 62/050,825, filed on Sep. 16, 2014, provisional application No. 62/112,938, filed on Feb. 6, 2015.

(51) Int. Cl.
*G02F 1/35* (2006.01)
*G02F 2/02* (2006.01)
(Continued)

(52) U.S. Cl.
CPC ............ *H01S 3/0092* (2013.01); *G02B 27/48* (2013.01); *G02F 1/3551* (2013.01); *G02F 1/37* (2013.01);
(Continued)

(58) Field of Classification Search
None
See application file for complete search history.

(56) References Cited

U.S. PATENT DOCUMENTS 8,693,513 B2 * 4/2014 Achtenhagen ........ H01S 3/2383
372/23
9,008,132 B2 * 4/2015 Keaton ................ H01S 3/0675
359/328

(Continued)

*Primary Examiner* — Rhonda Peace
(74) *Attorney, Agent, or Firm* — Yuri B. Kateshov, Esq.; Timothy J. King, Esq.

(57) ABSTRACT

A broad line red light generator is configured with a single mode (SM) pulsed ytterbium ("Yb") fiber laser pump source outputting pump light in a fundamental mode ("FM") at a pump wavelength which is selected from a 1030-1120 nm wavelength range. The disclosed generator further includes a SM fiber Raman converter spliced to an output of the Yb fiber laser pump source. The Raman converter induces an "n" order frequency Stokes shift of the pump light to output the pump light at a Raman-shifted wavelength within 1220 and 1300 nm wavelength range with a broad spectral line of at least 10 nm. The disclosed light generator further has a single pass second harmonic generator ("SHG") with a lithium triborate ("LBO") nonlinear optical crystal having a spectral acceptance linewidth which is sufficient to cover the broad spectral line of the pump light. The SHG generates a SM pulsed broad-line red light with a broad spectral line of at least 4 nm.

24 Claims, 3 Drawing Sheets

(51) Int. Cl.
*H01S 3/00* (2006.01)
*G02F 1/37* (2006.01)
*G02F 1/355* (2006.01)
*H01S 3/30* (2006.01)
*H01S 3/067* (2006.01)
*H01S 3/16* (2006.01)
*G02B 27/48* (2006.01)

(52) U.S. Cl.
CPC .......... *H01S 3/0675* (2013.01); *H01S 3/1618* (2013.01); *H01S 3/302* (2013.01)

(56) References Cited

U.S. PATENT DOCUMENTS

| | | | |
|---|---|---|---|
| 9,036,667 B2* | 5/2015 | Gapontsev | H01S 3/06708 |
| | | | 372/6 |
| 9,046,697 B2* | 6/2015 | Manni | G02B 27/48 |
| 9,379,516 B2* | 6/2016 | Keaton | H01S 3/0675 |
| 2012/0236881 A1* | 9/2012 | Nikolajsen | G02F 1/365 |
| | | | 372/3 |
| 2014/0160442 A1* | 6/2014 | Lee | H01S 3/302 |
| | | | 353/38 |
| 2017/0294754 A1* | 10/2017 | Leonardo | H01S 3/0092 |

\* cited by examiner

Known art

BROADBAND RED LIGHT GENERATOR FOR RGB DISPLAY

BACKGROUND OF THE DISCLOSURE

Field of the Disclosure

The present disclosure relates to a broadband red light generator based on a wavelength conversion scheme which includes a combination of fiber Raman converter and second harmonic generator such as lithium triborate nonlinear optical crystal (LBO) that operates to produce red light with a broad spectral linewidth of at least about 5 nm (which is capable of reducing speckle noise on the laser illuminated digital display).

Glossary

As used in this disclosure, the below listed terms have the following respective meanings:

Broad Spectral Line or Broadband refers the spectral line extending over a 5-25 nm wavelength range of Red light and at least 10 nm of infrared radiation at the desired Raman-shifted wavelength.

Continuous wave ("CW") laser refers to a laser that emits radiation continuously rather than in short bursts, as in a pulsed laser.

Duty Cycle refers to the product of the pulse duration and the pulse repetition frequency (PRF) for pulses that occur at regular intervals.

Diode Laser refers to a light-emitting diode designed to use stimulated emission to generate a coherent light output.

Gain refers to an increase in intensity, power, or pulse energy of a signal that is transmitted from one point to another through an amplifier.

Gain Medium refers to a material capable of generating optical gain.

Green light refers to the electromagnetic radiation in a range of wavelengths of roughly 495-570 nm.

Infrared Radiation ("IR") refers to electromagnetic radiation characterized by a vacuum wavelength between about 700 nm and 10,000 nm.

Laser is an acronym for light amplification by stimulated emission of radiation. A laser is a cavity that contains a gain medium.

Red Light is generally electromagnetic radiation in a range of frequencies roughly corresponding to a range of vacuum wavelengths between about 610 and 650 nm.

Transverse Mode describes the distribution of light energy across the fiber.

Multimode fiber refers to the fiber with a core dimensioned to support propagation of multiple transverse modes.

Nonlinear optical crystal refers to the lithium triborate nonlinear optical crystal (LBO).

Optical amplifier refers to an apparatus that uses a gain medium, which is driven by pumping radiation, to amplify the power of an input optical signal.

Optically Resonant Cavity ("cavity") refers to an optical path defined by two or more reflecting surfaces along which light can reciprocate or circulate.

Polarization Maintaining (PM) fiber refers to the single mode fiber which is configured to faithfully preserve and transmit the polarization state of the light that is launched into it.

Polarized light refers to the light in which individual transverse light waves are aligned parallel to one another.

Pulse Duration or pulse width refers to the time interval between the half-power points on the leading and trailing edges of the pulse.

Pulse Period (T) refers to the time between equivalent points of successive pulses in a train of two or more pulses.

Pulse Repetition Frequency (PRF) refers to the rate of repetition of pulses per unit time. The PRF is inversely related to the pulse period.

Quasi-CW refers to generating a succession of pulses at a high enough repetition rate to appear continuous.

Raman scattering refers to the non-linear Raman effect associated with the increase in wavelength (or reduction in frequency) of light scattered while passing through a fiber.

Single mode fiber refers to the fiber with the core dimensioned to support propagation of a single transverse mode.

Stokes orders of the Raman spectrum (Stoke) refer to different radiation bands or Raman lines appearing in the spectrum of monochromatic light in addition to standard lines due to Raman scattering.

Second harmonic generation (SHG) refers to the frequency conversion technique wherein input light at wavelength $\lambda$ generates output light at half the wavelength $\lambda/2$ (or twice the optical frequency of the input light) while propagating through a nonlinear optical material, such as nonlinear crystal.

Spectral acceptance of crystal refers to the spectral band within which the frequency conversion is observed Stokes Shift refers to the difference in wavelength between the excitation and emission maxima for a particular fluorescent substance.

Visible radiation or light—the portion of the electromagnetic spectrum that is visible to the human eye as red light in a wavelength range between 620 nm and 650 nm.

Speckle refers to the mark with a large number of small spots or patches of color.

Speckle noise refers to the observable random intensity pattern of speckles.

Art Discussion

The 610-650 nm wavelength range also commonly referred to as red light, (although strictly speaking light around a 620 nm wavelength is not a true red but reddish orange, whereas at 650 nm wavelength exhibits deep red tones), has a fair share of industrial applications. For example, red light is considered to be ideal for growing vegetables. Currently, red light sources find their broadest application in display industries, for example, red-green-blue (RGB) digital displays, which are of particular interest for this disclosure.

The diode lasers are the most widely used laser light sources for RGB digital displays because of the range of fairly bright and well defined available colors, their depth and saturation. However, the luminous efficiency of the red light diodes is low. The output power of individual red light diode lasers hardly exceeds 1 W which is simply too low for meeting the needs of many industrial laser applications.

The advent of laser light sources for RGB displays is associated with diode-pumped solid-state lasers and improved non-linear optical frequency conversion techniques rooted in nonlinear optics, as briefly disclosed immediately below.

Nonlinear Optics

When light travels through a transparent medium, like glass, it interacts with the molecules in a way that changes the light passing through. When the light is intense, additional effects are observed. One of these is that light of one wavelength (or, equivalently, frequency) may be converted to light of a different wavelength due to its interaction with certain types of transparent materials. This is called nonlinear frequency conversion.

Nonlinear Optical Frequency Conversion

In any frequency conversion process, there are two major factors that contribute to its efficiency, or how much of the light at the original/fundamental frequency is converted to the new frequency. First is the inherent efficiency of the transparent medium used. Frequency conversion can be achieved with many different types of materials, but some are simply more efficient than others. A good example of the latter is the disclosed here lithium triborate ("LBO") nonlinear optical crystal. A particular example of the optical frequency conversion is the second harmonic generation (SHG) which constitutes a part of the disclosed subject matter.

Returning to the diode-pumped solid lasers it should be noted that their use have resulted in efficient and reliable low to moderate power (at most a few watts in red and blue, and ten of watts in green) visible laser sources with diode laser lifetimes in excess of 10,000 hours. These sources are based on the SHG of various lines of the Neodymium (Nd) ion and hence are efficient for the green light generation based on SHG of the strongest Nd laser transitions around 1000 nm. However the same sources are much less efficient for red light generation based on SHG of the 1300 nm transitions.

Following other industries, the display industry has recently turned to fiber lasers which may be powerful, temperature independent, incomparably more bright and efficient than diode lasers. Yet, fiber lasers offer only limited wavelength tuning around center wavelengths near 1, 1.5, and 2 μm using ytterbium (Yb), erbium (Er), and thulium (Tm) dopants, respectively which obviously make fiber lasers unsuitable for directly generating visible light including red.

However, fiber lasers have enabled new light sources used to generate visible wavelengths by utilizing nonlinear optics and its effects. The power, beam quality, polarization, and linewidth properties make fiber lasers ideal sources for frequency conversion by nonlinear optical crystals. For high power conversion to the green, the SHG of Yb fiber lasers using LBO nonlinear crystals has produced several hundred-watt and even kilowatt average power green diffraction-limited outputs. The latter is disclosed in a U.S. Patent application 61/923,793 commonly owned with the present application by the same Assignee and fully incorporated herein by reference. Nonetheless, the SHG by itself is insufficient for producing red light.

A technology of Raman wavelength shifting in optical fibers can in principle produce optical amplification at any wavelength. The Raman wavelength shift is, not surprisingly, based on Raman nonlinear effect which is disclosed in US2011/0268140 incorporated herein by reference in its entirety and co-owned with the present disclosure by the same assignee. The following is a brief explanation of this phenomenon.

The Raman Effect

When intense laser light is coupled into an optical fiber, it generates a second, longer wavelength due to stimulated Raman scattering. This Raman-scattered light can itself undergo Raman scattering. If the fiber is long enough, the process cascades to produce several wavelengths or Stokes orders.

Multiple-order Raman scattering (SRS) generation, where the i-th Stokes order of the initial wavelength serves as a pump for generation of the (i+1)-th Stokes order, is utilized as a cascaded wavelength Raman converter (from shorter to longer wavelengths) for accomplishing a significant wavelength shift. Accordingly Raman converter can produce output wavelengths that might be not available from other types of laser sources. For example, the data in FIG. 1 was taken with standard polarization-maintaining, single mode commercially available fiber. The first three (3) Stokes waves generated by a 1060 nm pump beam coupled into the fiber are, approximately: 1. 1114 nm 2. 1170 nm 3. 1232 nm.

In the past, to efficiently convert the Raman Stokes orders into visible wavelengths using nonlinear crystals, it was desirable that the Raman Stokes waves have a narrow spectral line. The peaks of the Raman spectrum, as seen in FIG. 1, are however about 10 nm wide at first Stokes and more at subsequent Stokes. Such a broad spectral line is considered to be unacceptably broad for efficient conversion of IR light at the third Stokes order within a 1220-1300 nm wavelength range in nonlinear optical crystals because the latter have a narrow spectral acceptance range within the above-identified Raman-shifted wavelength range. Several techniques for narrowing the Raman spectrum are known.

However, the narrow Raman spectrum, particularly in the 1220-1280 nm wavelength range in combination with the spectral acceptance range of many nonlinear crystals is highly inefficient against a speckle noise as explained below.

Speckle Noise

During laser illumination, strong interference occurs, originating in the high coherency of laser light and the surface topography of the display, which is manifested by a plurality of speckles degrading the image. A pattern defined by multiple speckles is a fundamental source of noise in optical generators, and the suppression of speckle noise is of paramount importance in the video-display industries.

There are several known techniques allowing the speckle reduction. One of the techniques includes mutually non-coherent laser sources operating at different wavelengths. Since the speckle patterns for different wavelengths are uncorrelated, this achieves some speckle reduction. Another technique is based on variation of polarization. This technique can be practical for limited designs of the illumination optical generator and is generally inefficient. Still another technique encompasses the use of displaceable diffusing elements which create uncorrelated speckle patterns.

A further technique, which is highly pertinent to the disclosed subject matter, is based on laser sources with increased linewidth. Since speckle arises due to the highly coherent nature of laser radiation, it is practical to use sources with reduced coherence, such as the direct emission green laser diodes. However these diode lasers are known to have a narrow spectral linewidth which is insufficient to reduce speckle to acceptable levels. It should be noted that the brightest and most power efficient green lasers available today are frequency-doubled with the spectral linewidth not exceeding 0.1-0.2 nm.

The U.S. Pat. No. 8,786,940, fully incorporated herein by reference, discloses the apparatus that reduces laser speckle by using stimulated Raman scattering in an optical fiber for all primary colors including red. The disclosed apparatus is configured with a red light source based on a Q-switched, frequency doubled neodymium-doped yttrium lithium fluoride or neodymium-doped yttrium aluminum garnet laser, which outputs pulsed Green light around a 532 nm wavelength. The pulsed Green light is coupled into a MM fiber where it experiences stimulated Raman scattering converting to yellow, orange and red colors which are further optically filtered out. The experiments incorporating the disclosed apparatus however were not particularly encouraging mostly because the MM fiber rapidly degrades at relatively low power levels.

The Raman scattering is also disclosed in WO 2013/175387 teaching a yellow light fiber source. The source is configured with a narrow spectral linewidth Yb pulsed fiber laser source emitting pump light at a first wavelength which is coupled into an Yb fiber amplifier. The other narrow line CW seed laser emits a signal light at a target wavelength which is also coupled into the Yb fiber amplifier. The pump light coupled into the Yb amplifier is converted to signal light at a single Raman-shifted target wavelength or first Stokes order. The amplified light at the Raman-shifted target wavelength is then incident on a nonlinear crystal producing yellow light.

The above-discussed source has a few limitations. For example, the taught source is tailored to have the output with a narrow linewidth which is realized by providing narrow line pumps and Raman seed sources respectively. This alone would render the Yellow light source of this reference inefficient for speckle noise reduction, if this source were used to illuminate a display.

A need therefore exists for a red light fiber laser source utilizing SRS to have a power efficient, compact, reliable, and cost effective structure.

A further need exists for a red light fiber laser source capable of outputting red light with a sufficiently broad spectral line to considerably reduce the detrimental effects of speckle noise appearing, for example, on a laser illuminated digital display.

SUMMARY OF THE DISCLOSURE

The basic goal of this disclosure is to produce a laser beam of red color having a broad spectral line sufficient to minimize speckle noise on the illuminated digital display. This is attained by the disclosed fiber red light generator based on two main premises: 1. Raman converter emitting light at the desired Raman-shifted wavelength in a 1220-1300 nm emission wavelength range with a broad spectral line of up to 25 nm in a Raman fiber, and 2. The spectral acceptance of the broad spectral line at the desired Raman-shifted wavelength within the above-identified emission spectrum by an LBO nonlinear crystal to produce red light within a 610-650 wavelength range with a spectral linewidth exceeding 4 nm. The practical implementation of the disclosed source operative to output high power diffraction-limited broadband red light is realized in several embodiments briefly disclosed hereinbelow.

In accordance with one of the embodiments, the basic layout of the disclosed generator includes a broadband pulsed fiber laser source, generating a pump beam in a 1030-1120 nm wavelength range, and an Yb fiber amplifier. The pulsed beam is further coupled into a Raman shifter converting the pump beam to a pulsed beam at the desired Raman-shifted wavelength. The desired Raman-shifted wavelength varies between about 1220 and 1300 nm and has a broad emission spectral line of at least 10 nm. The signal beam is then focused on an LBO operating as a single pass second harmonic generator (SHG) which has a spectral acceptance covering the emission spectral line of pump light at the desired Raman-shifted wavelength. The red light produced in the LBO also has a broad spectral line of at least 4-5 nm which is sufficient to significantly minimize speckle noise on the illuminated screen.

The operation of the disclosed single pass Raman converter depends on the fiber configuration. In accordance with one configuration, the fiber has a phosphate-glass core in a silica glass cladding. This configuration allows a one Stoke conversion of the pump beam at the first wavelength to light at the desired Raman-shifted wavelength. In the alternative configuration, the Raman converter has a silica-glass core (with possible phosphate dopants) in a silica cladding. Here the conversion into the desired Raman-shifted frequency of the signal beam occurs at the third (3) Stokes order of the pump light.

A further embodiment of the disclosed red light generator includes a multi-wavelength Raman laser as disclosed in US2011/0268140. This embodiment may be realized by the following structures.

One of the possible configurations in accordance with this embodiment includes a pulsed laser source with a MOPFA architecture operative to emit a broad spectral line pump light beam at the desired pump wavelength which is selected within a wavelength 1030-1120 nm range which is coupled into a Raman laser. The latter includes a silica core/cladding fiber with a resonant cavity which has multiple reflectors with the utmost upstream and downstream reflectors defining a resonant cavity. The output reflector is at least partially transmissive to output signal light at the desired Raman-shifted frequency of the pump beam from the resonant cavity which is then coupled into the LBO at a wavelength in a 1220-1300 nm wavelength range. The SH generator, including an LBO nonlinear crystal, receives the pump beam at the desired Raman-shifted wavelength and produces red light with a sufficiently broad spectral linewidth sufficient to minimize speckle noise on the illuminated display.

The pump beam is emitted in short pulses each with a pulse width in a picosecond-nanosecond range. The operation of this configuration is based on a synchronous pump Raman laser scheme. Specifically, this scheme operates so that the round-trip time of the resonating Raman converted light pulse matches the pump beam repetition rate such that each subsequent signal light pulse at the Raman shifted wavelength is coincident both temporally and spatially with a respective pump light pulse in the Raman converter.

Another structural configuration uses a Fabri-Perot pulsed laser outputting long pump light pulses each with a width in a microsecond and longer range. The pump light pulses are then coupled into the Raman laser which is configured to emit signal pulses at the desired Raman-shifted wavelength in a 1220-1300 nm wavelength and having a broad spectral line. The LBO, receiving the Raman-shifted light, produces pulsed red light. In contrast to the previously disclosed synchronous pumping scheme, this configuration does not need the synchronicity since the width of the pump light pulse is substantially longer than the round trip of the light pulse in the resonant cavity of the Raman laser.

BRIEF DESCRIPTION OF THE DRAWINGS

The above and other features of the disclosure will become more readily apparent from the following specific description in conjunction with the drawings, in which.

SPECIFIC DESCRIPTION

By way of introduction, embodiments of the disclosure are directed to a novel broad spectral line red light generator and method for emitting high power, broad linewidth, single mode (SM) laser pulses in the 610-650 nanometer (nm) range. A broad line pulsed SM IR fiber laser source is configured to emit a train of pulses pumping a SM Raman fiber converter which leads to efficient Raman conversion of IR energy generating Raman-shifted IR light in a wavelength range between 1220 and 1300 nm. The desired wavelength selected from the Raman-shifted wavelength range has a broad spectral linewidth varying between 10 and 25 nm with the upper limit typically being even higher. The IR light at the Raman-shifted wavelength is coupled into a single pass second harmonic generator which includes a standard LBO nonlinear crystal producing SM Red light pulsed light in a 610-650 nm wavelength range with a spectral line of about 5 nm and broader.

The disclosed red light generator is a unique structure utilizing a standard LBO crystal, whose spectral acceptance is broad to accept a substantial segment of the 10-25 nm linewidth of IR light at the desired Raman-shifted wavelength within a 1210-1250 nm range, and capable of operating with the overall device wall plug efficiency of about 10% within the disclosed Red light wavelength range. The SM Red light beam with a kW-level peak power and broad spectral linewidth is particularly useful for illuminating a digital display while effectively minimizing speckle noise.

Figure 1:
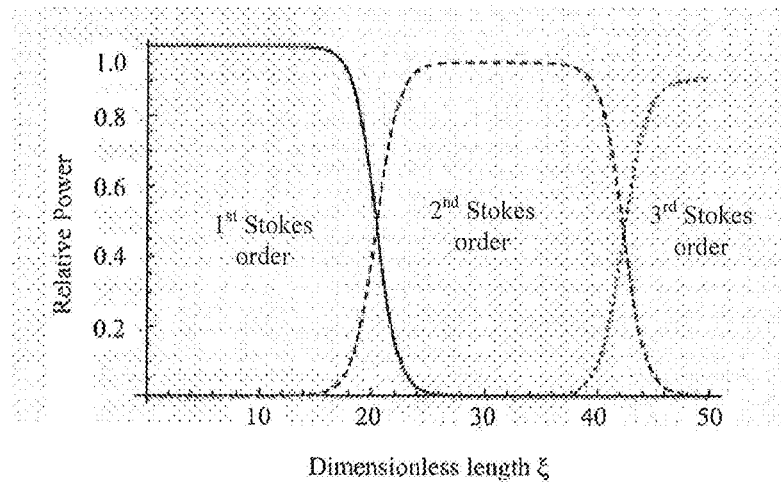
FIG. 1 is a Raman Spectrum of a Raman-shifted pump light.
Figure 2:
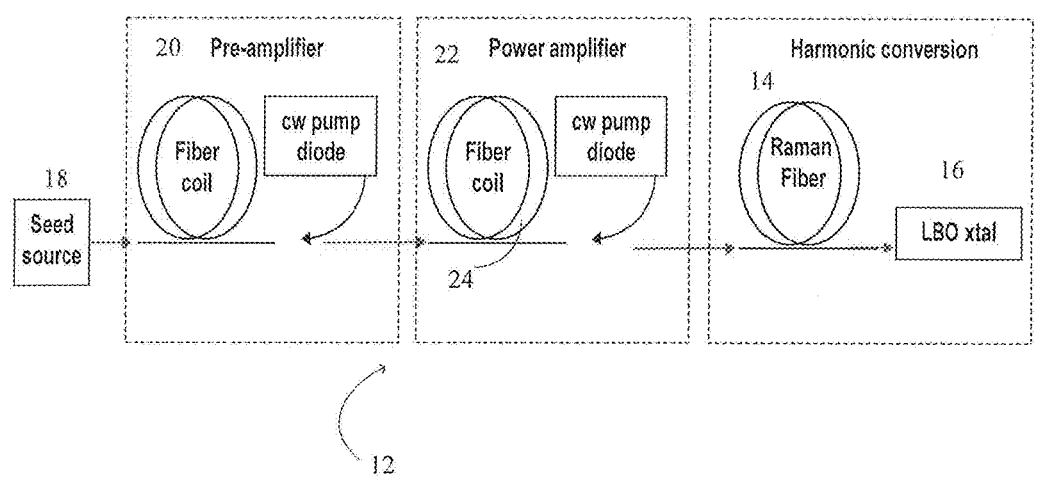
FIG. 2 illustrates a basic layout of the disclosed broad line red light generator.

Referring now to the drawings, FIG. 2 illustrates the basic layout of the disclosed red light generator 10 based on a harmonic generation scheme which includes a Raman converter 14 in combination with a standard LBO nonlinear crystal 16. The IR pump source 12 defines the temporal characteristic of Raman gain by outputting IR pulsed light at a pump wavelength selected from a 1030-1120 nm wavelength range and, in this embodiment, has a MOPFA configuration. In particular, IR source 12 includes a tunable pump seed/master oscillator 18 configured as a broad spectral line SM diode laser 18 with a polarization maintaining (PM) fiber pigtail which is operative to emit a train of pulses in a picosecond-nanosecond (ps-ns) pulse width range. The pulsed pump light is then coupled into an Yb fiber laser amplifier or booster 22 which is configured to boost the pulsed pump light up to a multi kW peak power level at the desired IR pump wavelength. Optionally, the IR pump laser source may include one or more pre-amplifying stages 20 each configured with an Yb-doped PM fiber and gradually amplifying the pump seed signal before it is coupled into power amplifier or booster 22. The amplifying stages each include a gain block configured with a housing which encases an Yb doped active fiber spliced at its opposite ends to respective SM PM passive fibers that may terminate outside the housing. The pumps of amplifiers 20 and 22 include respective one or more diode laser modules operating in a CW regime.

Figure 3:
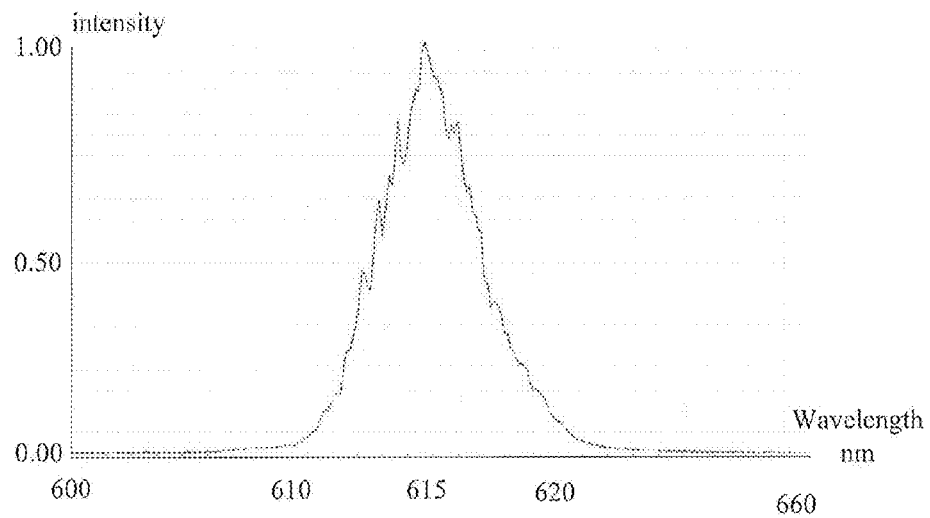
FIG. 3 illustrates the 3rd Stokes of a Raman spectrum obtained by means of the configuration of FIG. 2.

The broad linewidth red light generator 10 is configured with IR pump source 12 operating in a QCW regime which is provided by coupling the output of pump seed source 18 to a separate electro-optic intensity modulator for setting the pulse or directly modulating laser diode for setting a pulse width. The pulsed pump light is output at a repetition rate in a 1 to 100 MHz frequency range, wavelength selected from a 1030-1120 nm range and with a pulse in a ps-ns range. The preamplifier 20 is configured to output pulsed light at an average power of about 1 W before power amplifier boosts the average power of the pulsed pump light to about 200 W and higher. The Raman converter may include a multi-meter-long nonlinear passive fiber having a multi-micron core diameter. In the schematics of FIG. 2, about 50-80% of the output IR pump power may be converted to the third or fourth Stokes order at about 1230 nm wavelength depending on the pump wavelength of seed 18. The SM pulsed light at the 1230 Raman-shifted wavelength after being frequency doubled in 20 mm long LBO 16 produces the visible spectrum shown in FIG. 3 with a central wavelength around 615 nm and a spectral bandwidth of more than 5 nm which is sufficient to substantially minimize speckle noise.

One of the keys to power scaling of red light generator 10 lies in the increased core size of all active and passive large mode area fibers. For example, the core size may be 20 microns which would allow a clean Raman spectrum to be produced at 15-20 kW IR peak power or more. The increased IR peak power, as one of ordinary skill readily realizes, significantly increases the conversion efficiency. For the suggested large mode area fibers, the conversion efficiency from 1060 nm to 615 nm may approach 25%.

Still another approach to the power scaling of red light generator 10 includes increasing the average power by controlling the duty cycle of the IR pump light source. In particular, the repetition rate of the pump seed 18 can be increased and turn up the pump power, keeping the peak power constant.

Figure 4:
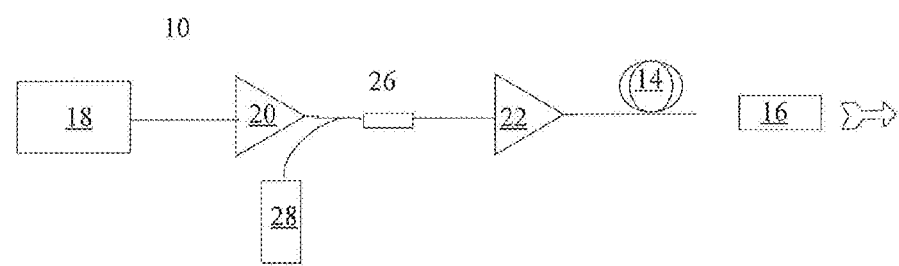
FIG. 4 illustrates the modification of the red light generator of FIG. 2.

FIG. 4 illustrates a modification of broad line Red light generator shown in FIG. 2. Similar to the basic layout, red light generator 10 is configured with master oscillator 18 whose output is modulated to generate a train of pulses in a 1030-1120 nm wavelength range. One or more pre-amplifying and booster cascades each are configured with an Yb doped fiber pumped by a laser diode pump which operates in a CW regime. The amplifiers 20 and 22 sequentially increase the power of pulsed pump light which is further coupled into Raman converter 14 where it is effectively converted to sequential Stokes orders with the third Stokes order being the desired 1220-1300 nm wavelength range and a broad spectral linewidth. The single pass SH generator including an LBO crystal 16 is configured with a broad spectral acceptance at the desired Raman-shifted wavelength provided by a Raman shifter 14 that covers at least a substantial part of the spectral linewidth of the IR light within the desired Raman-shifted wavelength range.

The linewidth of the IR light in the desired 1220-1300 nm Raman-shifted wavelength range may still be excessively broad and detrimentally affect the conversion efficiency despite the broadband spectral acceptance range of LBO 16. In this case, the 3rd Stokes order may be narrowed by pumping Raman converter by light from a broadband SM Raman seed 28 operating in a CW regime at a wavelength which is selected from a band of wavelengths of the second Stokes order. By doing so, the 2d Stoke is amplified by stimulated Raman scattering which decreases the linewidth of this Stoke. As a result, the linewidth of the 3 Stoke narrows. In this schematic, temporal characteristics are determined by the pump seed 18, while the spectral properties of the light at the Raman-shifted wavelength are determined by the CW Raman seed 28. Accordingly, the wavelength and linewidth of the Raman seed's SM output can be tailored to a specific linewidth within the desired 1220-1300 nm wavelength range.

Figure 5:
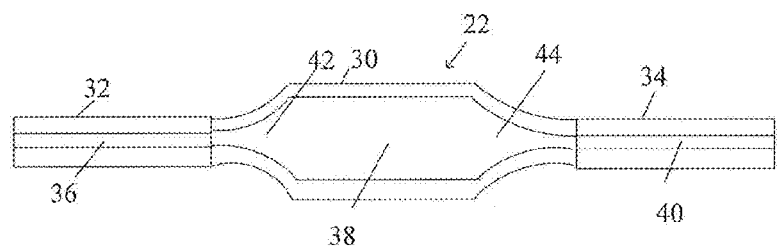
FIG. 5 illustrates the configuration of a booster amplifying stage utilized in schemes shown in FIGS. 2 and 4.

FIG. 5 illustrates booster 22 includes a housing (not shown) encasing input and output identically dimensioned SM PM passive fibers 32 and 34 which are spliced to respective opposite ends of PM Yb-doped silica fiber 30. The latter has a MM core 38 capable of supporting a SM at the pump wavelength and including opposite uniformly-dimensioned core ends which are configured so that an MFD of a fundamental mode (FM) matches an MFD of SM pump light guided by respective SM fibers 32 and 34. The matching MFD diameters of respective SM and FM and adiabatically expanding and narrowing mode-transforming regions 42, 44 respectively of MM core 38 provide the excitation and support of only one FM.

Figure 6:
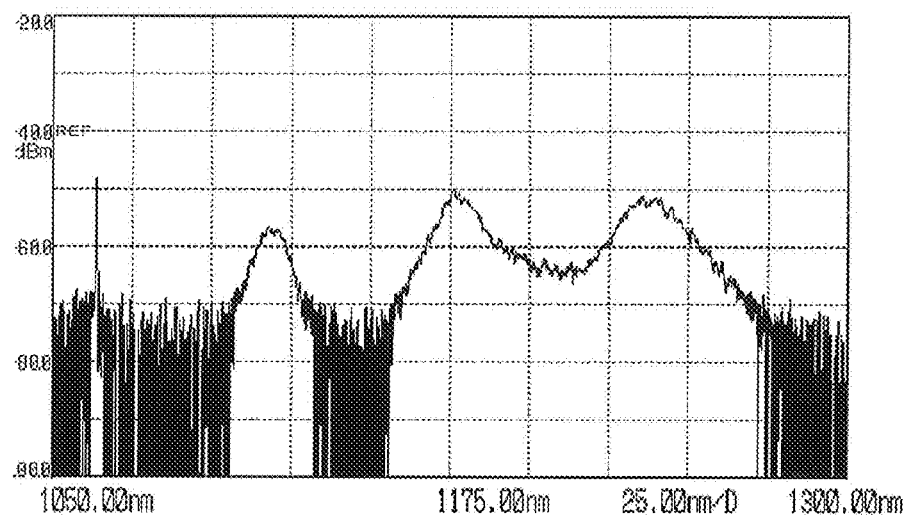
FIG. 6 illustrates the Raman spectra produced by the IR pump source of the schematic of FIG. 4.

The CW SM Raman seed 28 can be configured as a broadband Fabry-Perot fiber or diode laser, distributed Bragg reflector (DBR) or distributed feedback laser (DFB) or wavelength-stabilized laser seeding Raman converter 14 at intermediate Stokes. In particular, Raman seed 28 emits light at a Raman-shifted wavelength which is selected from in a 1130-1175 nm wavelength range of the 2 Stokes order of Raman converter 14. The outputs of respective pump and Raman seed sources are combined in a fiber WDM 26 located preferably, but not necessarily upstream from booster 22 which amplifies only pump seed light at 1064 nm wavelength to about 20-30 W average power and 5-10 kW peak power. The Raman spectrum is illustrated in FIG. 6 with the linewidth of the 3 Stoke of about 25 nm.

The Raman fiber shifter 14 is configured with the lengths exceeding 5 meters. For example it can be a 30-100 meter long SM PM passive fiber operating at a high 50-80% Raman conversion efficiency which, in this example, translates to up to 6 kW peak power Raman-shifted light at the desired 1230 nm wavelength. The LBO 16 is dimensioned to be 40 mm long, 5 mm wide and 3 mm thick I type crystal operating at about 35-50% SHG efficiency. The average power of SM Red light at about 615 nm wavelength is within a 45-110 W range, whereas its peak power varies between 1.1 and 2.8 kW.

Both of the above-disclosed configurations of the wideband Red light generator, based on a Raman converter and single pass SHG wavelength conversion scheme, utilizes a SM PM silica-core passive nonlinear fiber for the disclosed Raman converter. However, silica-based fibers are not the only choice to produce the IR light in a 1220-1300 nm range. A viable alternative to silica fibers includes the use of fibers with a phosphate glass core which produce a substantially wider 1 Stokes order than a standard silica-core fiber. In fact so much broader that the desired 1220-1300 Raman-shifted wavelength band is covered by the $1^{st}$ Stoke.

Figure 7:
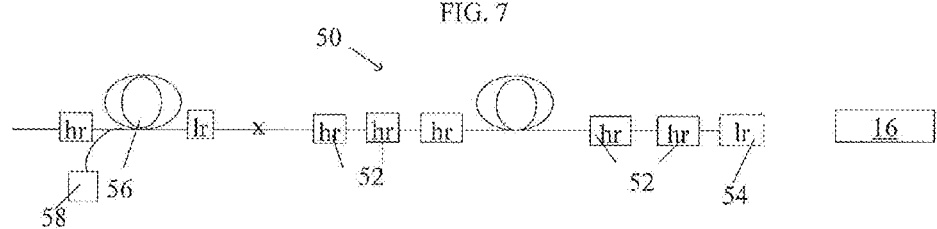
FIG. 7 illustrates the red light generator configured with a Raman fiber laser and a directly modulated QCW IR pump source.
Figure 8:
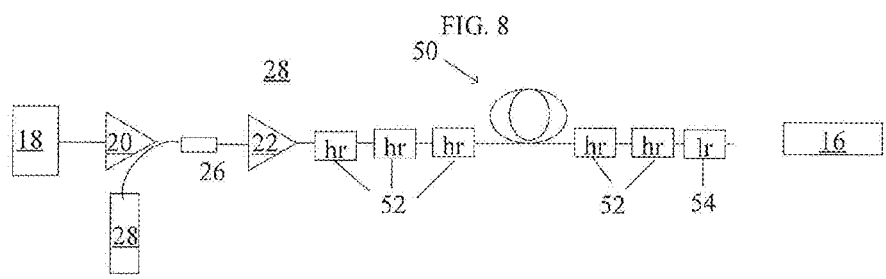
FIG. 8 illustrates the red light generator with a Raman fiber Laser and a QCW IR pump source with a MOPFA configuration.

A further embodiment illustrating a cascaded Raman fiber laser is illustrated in FIGS. 7 and 8. The principle of this embodiment is to convert the frequency of the pump's output to the required Red light output wavelength using a series of Raman Stokes shifts. Conventionally, wavelength conversion over two or more Stokes shifts is performed by a cascaded Raman resonator. It is comprised of nested cavities at each of the intermediate wavelengths made with high reflectivity fiber Bragg gratings or reflectors 52. Each intermediate wavelength in the resonator is chosen to be close to the peak of the Raman gain of the wavelength preceding it. A low reflectivity output reflector or coupler 54 terminates the wavelength conversion which is selected from 1220-1300 nm range of wavelengths.

Referring specifically to FIG. 7, the disclosed red light generator includes a broadband QCW IR pump source with directly modulated semiconductor laser seed 58 which is realized by an external electrical pulse generator. The light at the desired pump wavelength is coupled into a cavity of pulsed Yb fiber laser 56 which is defined between a high reflector (HR) and low reflector (LR). In contrast to all fiber used in the above-disclosed configurations, the Yb-doped fiber laser may or may not be a PM fiber. The IR source is operative to output long microsecond pulses at the desired pump wavelength.

The pump light is further coupled into a multi-cascaded SM LP Raman laser 50 provided with multiple HRs and downstream LR providing generation of three Stokes with the 3 Stoke at the desired Raman-shifted wavelength range coupling out from the cavity either with or without LR 54. The Raman-shifted pump light emitted from Raman laser 50 is characterized by a broad spectral line spectrally accepted by LBO 16 which is operative to generate SM Red light with a broad spectral linewidth of at least about 5 nm in a 1220-1300 nm wavelength range.

FIG. 8 illustrates the IR pump source configured with a MOPFA configuration which has seed 18 and one or more amplifying stages 22. The booster stage is based on the same fiber configuration as shown in FIG. 5. The rest of components correspond to respective components of the generator 10 of FIG. 4 and includes broadband Raman seed 28 and WDM 26. The Raman laser is synchronously pumped. The amplified pump light at the desired pump wavelengths is combined in WDM 26 with the light from Raman seed 26 generated at the desired Raman-shifted wavelength which is selected from a 1220-1300 nm wavelength range. The amplified pump light and Raman-shifted light is then coupled into Raman laser 50. The light at the Raman-shifted wavelength is converted in the SHG LBO to the desired broadband Red light.

The basic platform of the the above-disclosed broad spectral line light generator may be easily utilized to generate Green, Yellow, Orange "589 nm" and long Red light. The platform, as shown in FIGS. 2, 4, 5 and 7-8, includes an IR QCW laser source at a 1030-1070 nm range, wideband light generator configured with the disclosed Raman shifter and single pass SHG wavelength conversion scheme. The generation of a specific color depends on which Stoke order is eventually converted in the Raman converter. Clearly, the first Stoke yields Green Light. The generated second Stoke is necessary to output Yellow and Orange and a specific fundamental wavelength, for example, 1064 nm. The fourth and even fifth Stokes help to extend the wavelength of converted light to long Red light wavelength range. Regardless of output colors, the linewidth of the output light is at least 1 nm that can be successfully used not only in laser illuminating display industries, but also in many others including, for example, marking.

Having described the embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:
1. A broad line red light generator (for an RGB display), comprising:
a single mode (SM) pulsed ytterbium ("Yb") fiber laser pump source configured to emit pump light in a fun- damental mode ("FM") at a pump wavelength which is selected from a 1030-1120 nm wavelength range;

SM fiber Raman converter spliced to an output of the Yb fiber laser pump source and having a core guiding the pulsed pump light, and a cladding surrounding the core, wherein the Raman converter induces an "n" order frequency Stokes shift of the pulsed pump light to output the pump light at a desired Raman-shifted wavelength which varies between 1220 and 1300 nm and has a broad spectral line of at least 10 nm, wherein "n" is an integer; and a single pass second harmonic generator ("SHG") including a lithium triborate ("LBO") nonlinear optical crystal which receives the pump light at the Raman-shifted wavelength and has a spectral acceptance linewidth which is sufficient to cover the broad spectral line of the pump light, wherein the SHG generates a SM pulsed broad-line red light at half the desired Raman-shifted wavelength with a broad spectral line of at least 5 nm.

2. The broad line red light generator of claim 1, wherein the SM Yb laser pump source and SM fiber Raman converter are each configured with a PM fiber having a silica core in a silica cladding.

3. The broad line red light generator of claim 2, wherein the SM Raman converter is configured with a length sufficient to induce a third or fourth order frequency Stokes to convert the pump wavelength of the pump light to the desired Raman-shifted wavelength.

4. The broad line red light generator of claim 2, wherein the Raman converter operates with a conversion efficiency within a 50-80% range, and overall wall plug efficiency of the generator varies within a 6-10% range.

5. The broad line red light generator of claim 1, wherein the SM fiber Raman converter includes a phosphate-glass core in a silica cladding.

6. The broad line red light generator of claim 5, wherein the SM Raman converter is configured with a length sufficient to induce a first order frequency Stoke to convert the pump wavelength of the pump light to the desired Raman-shifted wavelength.

7. The broad line red light generator of claim 1, wherein the Yb fiber laser source is configured with a master oscillator power amplifier (MOPFA) scheme including a Fabry-Perot diode laser or distributed Bragg reflector (DBR) or distributed feedback laser (DFB) or wavelength-stabilized laser diode with a polarization-maintaining (PM) fiber pigtail emitting the pump beam at the pump wavelength and a PM fiber booster, the fiber booster being configured to output the pulsed pump light with a peak power of several kilowatts (kW).

8. The broad line red light generator of claim 7, wherein the fiber booster includes
 a PM Yb-doped active fiber having a MM core which is configured with a double bottleneck-shaped cross-section and dimensioned to support the SFM at the pump wavelength,
 a PM SM input passive fiber having a core which guides a SM of the pump light, the cores of respective passive and Yb-doped core having respective ends butt spliced to one another to provide coupling of the SM into a core end of the MM core of the Yb-doped fiber which excites therein the FM, the core of the PM SM input passive fiber and the core end of the Yb-doped fiber being configured so that mode field diameters ("MFD") of respective SM and FM substantially match one another.

9. The broad line red light generator of claim 7 further comprising a Raman light seed source operating in a continuous wave (CW) regime to emit the light at the desired Raman-shifted wavelength which is coupled into the SM Raman converter.

10. The broad line red light generator of claim 9 further comprising a wavelength-division multiplexing (WDM) which multiplexes the pump light and light at the desired Raman-shifted wavelength either upstream from or downstream from the fiber booster.

11. The broad line red light generator of claim 1, wherein the desired Raman-shifted wavelength with a broad spectral line of at least 5 nm is sufficient to substantially reduce speckle noise upon illuminating the RGB display.

12. A broad line red light generator (for an RGB display), comprising:
 a single mode (SM) pulsed ytterbium ("Yb") fiber laser pump source emitting pump light in a fundamental mode ("SFM") at a pump wavelength between about 1030 nm and about 1120 nm;
 a SM fiber Raman laser spliced to an output of the Yb fiber laser pump source and having a core guiding the pulsed pump light, and a cladding surrounding the core, wherein the Raman laser induces an "n" order frequency Stokes shift of the pulsed pump light to output pulsed pump light at a desired Raman-shifted wavelength which varies between 1220 and 1300 nm and has a broad spectral line of at least a 15 nm linewidth, wherein n is an integer; and
 a lithium triborate ("LBO") nonlinear optical crystal receiving the pump light at the desired Raman-shifted wavelength and having a spectral acceptance bandwidth sufficient to cover the broad spectral line of the output pump light to generate a SM pulsed broad-line red light at half the desired Raman-shifted wavelength, wherein the red light has a broad spectral line of at least 5 nm.

13. The broad line red light generator of claim 12, wherein the SM fiber Raman laser is configured with a silica core surrounded by a silica cladding, a plurality of spaced reflectors being written in the silica core defining a resonant cavity.

14. The broad line red light generator of claim 13, wherein the SM Raman laser includes five high reflectivity Bragg gratings.

15. The broad line red light generator of claim 14, wherein the Raman laser is configured with or without an output low reflectivity Bragg grating transparent to the pump light at the desired Raman-shifted wavelength.

16. The broad line red light generator of claim 13, wherein the Yb fiber laser source is configured with a master oscillator power amplifier (MOPFA) scheme including a Fabry-Perot diode laser, DBF, DBR or wavelength-stabilized with a polarization-maintaining (PM) fiber pigtail and a PM fiber booster, the fiber booster being configured to output the pulsed pump light with a peak power of several kilowatts (kW).

17. The broad line red light generator of claim 16, wherein a round-trip time of each signal light pulse at the desired Raman-shifted wavelength in the resonant cavity matches a pump beam repetition rate such that each subsequent signal light pulse at the desired Raman-shifted wavelength is coincident both temporally and spatially with the pump light pulse coupled into the Raman laser.

18. The broad line red light generator of claim 13, wherein the Yb fiber laser source includes a pulsed Fabri-Perot laser configured to output a train of pump pulses each having duration in a microsecond range.

19. A broad line red light generator (for an RGB display), comprising:
- a single mode (SM) pulsed ytterbium ("Yb") fiber laser pump source emitting pump light in a fundamental mode ("SFM") at a pump wavelength in a 1030 nm-1120 nm range;
- a SM fiber Raman converter spliced to an output of the Yb fiber laser pump source and having a core guiding the pulsed pump light; and a cladding surrounding the core, wherein the Raman converter induces an "n" order frequency Stokes shift of the pulsed pump light to output signal light at a desired Raman-shifted wavelength which varies between 1220 and 1300 nm and has a broad spectral line of at least a 15 nm linewidth, wherein n is an integer; and
- a lithium triborate ("LBO") nonlinear optical crystal receiving the signal light at the Raman-shifted and having a spectral acceptance bandwidth sufficient to cover the broad spectral line of the pump light to generate a SM pulsed broad-line red light at half the desired Raman-shifted wavelength, wherein the red light has a broad spectral line of at least 5 nm.

20. The broad line red light generator of claim 19, wherein the Raman converter is a Raman shifter or Raman Laser.

21. The broad line red light generator of claim 19 further comprising a Raman light seed selected from a Fabry-Perot Raman fiber laser or Fabry-Perot diode or DBF, or DBR or wavelength-stabilized laser and operative to emit pulsed signal light at the desired Raman-shifted wavelength, and a WDM located upstream from the Raman converter and configured to multiplex the pump and signal light pulses at respective pump and Raman-shifted wavelengths.

22. The broad line red light generator of claim 19, wherein the desired Raman-shifted wavelength with a broad spectral line of at least 5 nm is sufficient to substantially reduce speckle noise upon illuminating the RGB display.

23. A broad line light generator (for an RUB display), comprising:
- a single mode (SM) pulsed ytterbium ("Yb") fiber laser pump source configured to emit pump light in a fundamental mode ("FM") at a pump wavelength which is selected from a 1030-1120 nm wavelength range;
- a SM fiber Raman converter spliced to an output of the Yb fiber laser pump source and having a core guiding the pulsed pump light, and a cladding surrounding the core, wherein the Raman converter induces an "n" order frequency Stokes shift of the pulsed pump light to output the pump light at a desired Raman-shifted wavelength, wherein the "n" order is selected from the group consisting of first, second, third, fourth and fifth Stokes orders; and
- a second harmonic generator ("SHG") including a lithium triborate ("LBO") nonlinear optical crystal which receives the pump light at the Raman-shifted wavelength and has a spectral acceptance line width which is sufficient to cover the broad spectral line of the pump light, wherein the SHG generates a SM pulsed broad-line light at half the desired Raman-shifted wavelength with a broad spectral line of at least 1 nm.

24. The broad line generator of claim 23, wherein the broad-line light is selected from the group consisting of Green Yellow, Orange, Red and a combination of these.

* * * * *

UNITED STATES PATENT AND TRADEMARK OFFICE
CERTIFICATE OF CORRECTION

PATENT NO. : 10,008,819 B2
APPLICATION NO. : 15/511798
DATED : June 26, 2018
INVENTOR(S) : Leonardo et al.

It is certified that error appears in the above-identified patent and that said Letters Patent is hereby corrected as shown below:

On the Title Page

Item (75) should read:
(75) Inventors: Manuel Leonardo, Santa Clara, CA (US)
Igor Samartsev, Westborough, MA (US)
Alexey Avdokhin, Southborough, MA (US)
Gregory Keaton, Oxford, MA (US)
Andreas Vaupel, Longmeadow, MA (US)

Signed and Sealed this
Twenty-fourth Day of November, 2020

Andrei Iancu
*Director of the United States Patent and Trademark Office*